Jan. 9, 1934.  P. J. DHEIN  1,942,806
MINE CAR BRAKE
Filed April 22, 1932   3 Sheets-Sheet 1
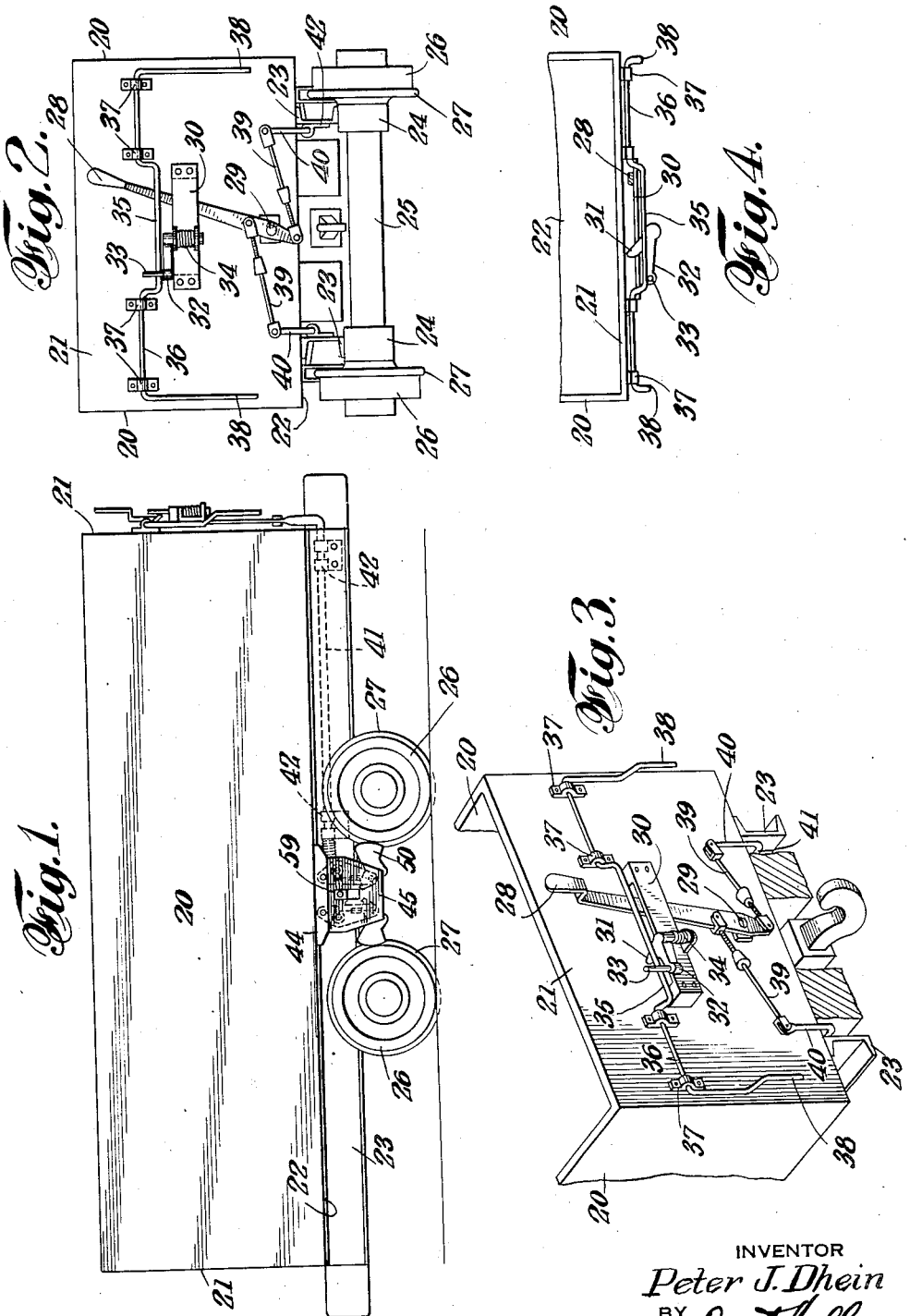

Jan. 9, 1934.  P. J. DHEIN  1,942,806
MINE CAR BRAKE
Filed April 22, 1932  3 Sheets-Sheet 2
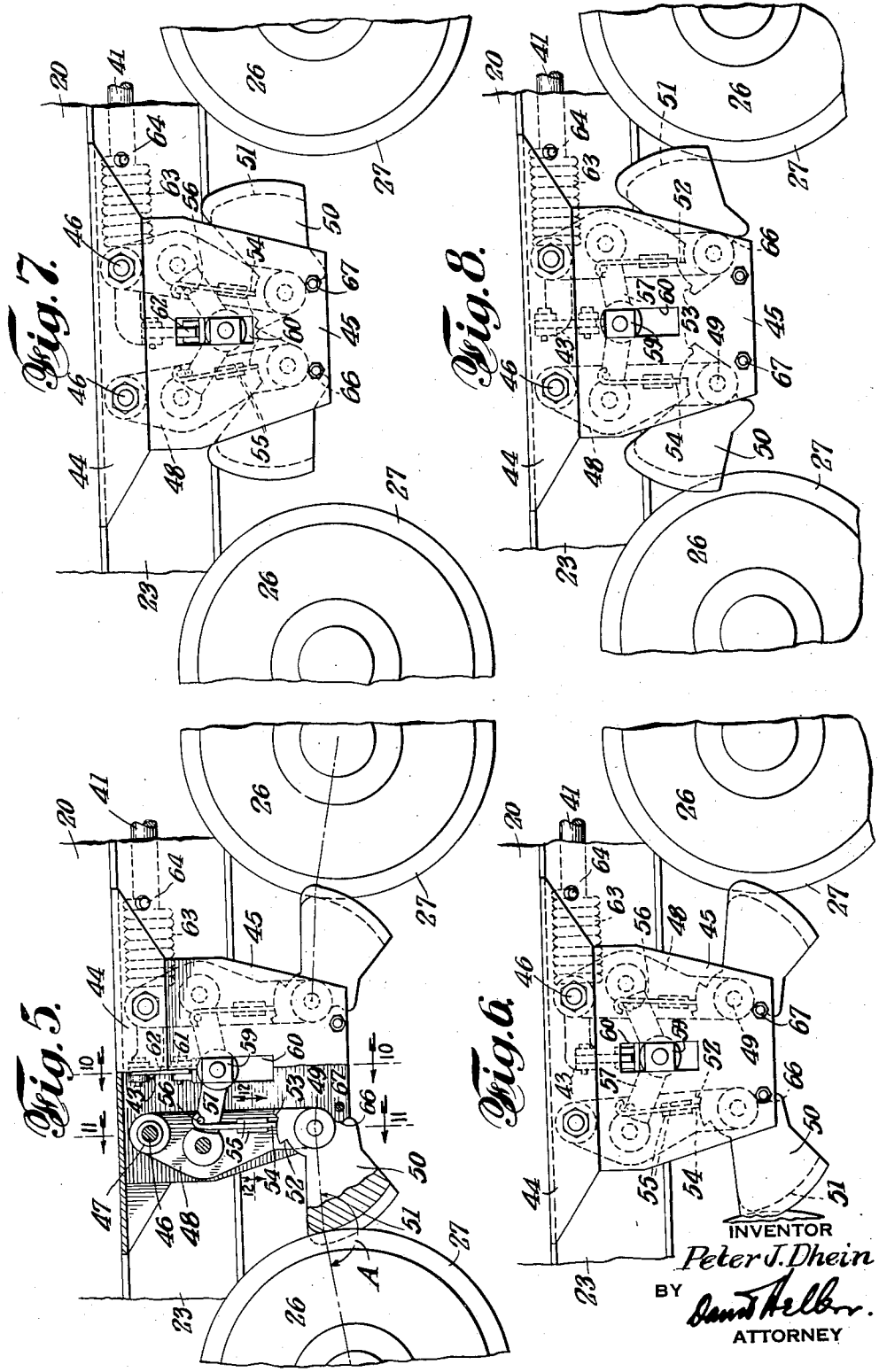
INVENTOR
Peter J. Dhein
BY
ATTORNEY Jan. 9, 1934.    P. J. DHEIN    1,942,806
MINE CAR BRAKE
Filed April 22, 1932    3 Sheets-Sheet 3
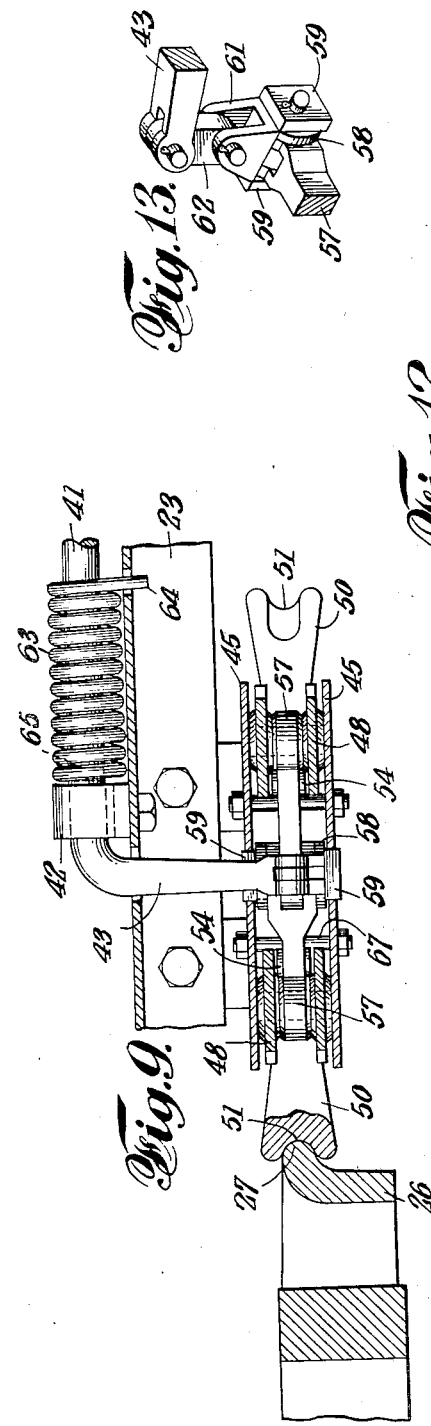
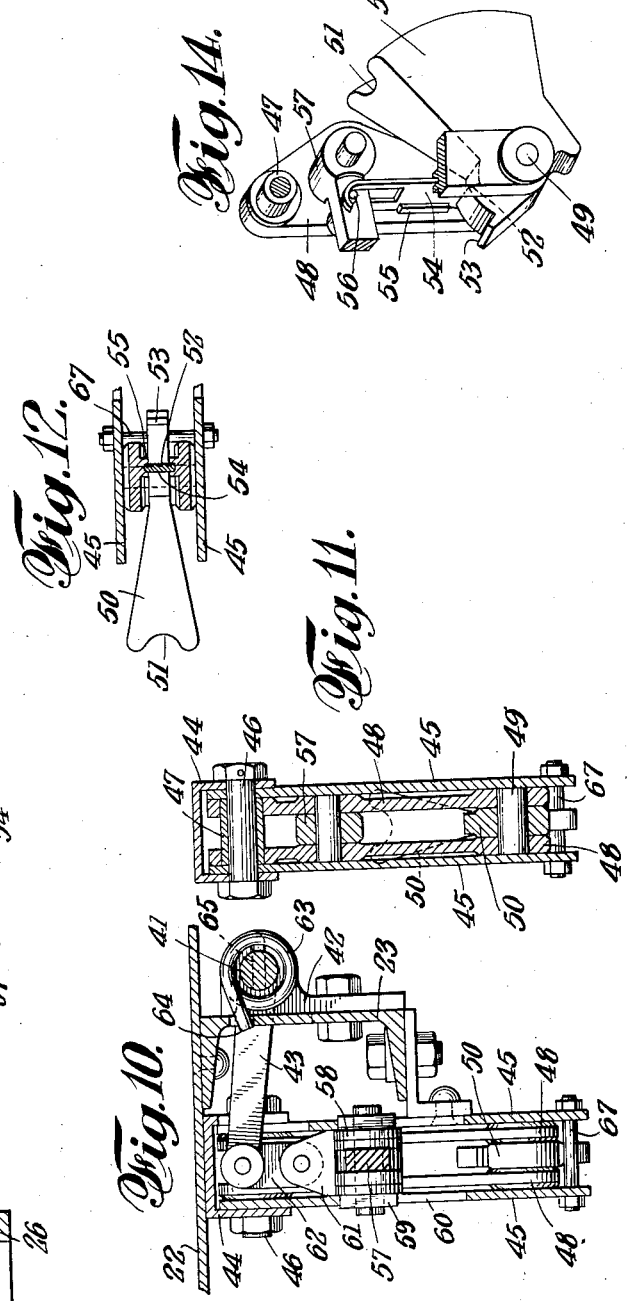
INVENTOR
Peter J. Dhein
BY
ATTORNEY Patented Jan. 9, 1934

1,942,806

UNITED STATES PATENT OFFICE 1,942,806

MINE CAR BRAKE

Peter J. Dhein, Pottsville, Pa.

Application April 22, 1932. Serial No. 606,848

27 Claims. (Cl. 188—55)

This invention relates to brakes for industrial cars generally and more particularly to brakes for free running mine cars.

Mine cars as at present used with respect to braking are all hand operated. The car will attain a speed of approximately 10-15 miles per hour in transit and since the mine laws forbid a riding operator, one is stationed at a point along the tracks where the car is to be brought to a stop. One of the methods now used for braking a car is that known as spragging and entails the injecting of a sprag between the spokes of one of the wheels and the car body as the car moves by. It can be readily understood how hazardous this method is and how skillfully it must be done. Injuries to the operator are quite common and destruction of the car practically deliberate. Only spoked wheels may be used for this spragging method of braking, also the wheels must be quite large thereby reducing the capacity of the car. Sprags are difficult to remove, frequently requiring the labor of two men to accomplish. Then again sprags stop the movement of the car in one direction only and when making up a mine car train, should the spragged car bump the one to which it is to be coupled with some force the recoil of the spragged car would be a matter of several feet and two or three men would be needed to move the loaded car back into coupling position. A constant supply of sprags must be scattered along the tracks so one is always at hand they are therefore a tripping hazard to men working in that area.

It has been found that the use of sprags is the main cause of broken flanges and spokes of wheels and of spreading rails.

The sprag braking method at best is a mere make-shift destructive, hazardous and entirely uneconomical method.

The other method of braking in common use, employs brake shoes which are applied to the car wheels by pulling a lever. In this case the operator waiting by the track for the car to pass must grasp the operating lever of the passing car, and to avoid injury, he must run along with the moving car pull the brake lever at the same time and should there be any wear in the lever ratchet teeth or between the shoes and the wheels, either the brakes would grip before the lever engages the proper ratchet tooth and then slack off after the operator releases the brake lever or the brake shoes at their maximum movement would not have proper contact with the wheels.

When it is kept in mind that the mentioned conditions are present not only at the surface operations but in the darkened interiors of the mine tunnels, and when it is remembered that these operations of braking mine cars must be repeated by an operator from 500 to 800 times a day it will be realized that there is a need for a more simple, safe, sure, and economical method of braking cars.

It is therefore a primary object of this invention to provide for vehicles and particularly for mine cars, a braking mechanism which will be simple of construction, easy and safe of operation and positive in its action and one which will reduce to a minimum the hazards heretofore encountered.

It is a further object of the invention to provide a car braking mechanism which is automatic in operation upon the release of a latch which normally retains the mechanism in inactive position.

A still further object is to provide in a car braking mechanism a brake shoe so arranged that the rotation of the wheel that is being braked will induce the braking action of the brake shoe.

A further object is to provide in brakes for industrial cars, a brake lever manually operable to position the brake shoes in readiness for action and which brake shoes automatically brake the wheels of the car upon manual operation of a releasing lever.

A still further object is in the provision of braking mechanism for cars in which the trailing wheels, with respect to the movement of the car, are braked.

A still further object is to provide braking mechanism having releasable, gravity brake shoes in which the braking force is automatically commensurate to the speed of the car.

A still further object is in the provision of braking mechanism which automatically compensates for wear and which therefore does not require adjustment or replacement of worn parts.

The foregoing and many other objects and advantages of the invention will further become apparent from the following specification describing the attending drawings, which by way of example illustrate a preferred embodiment of the invention and in which:

Fig. 1 is a side elevational view of a mine car equipped with braking mechanism in accordance with the invention.

Fig. 2 is an end elevational view of the same and illustrates the control members of the braking mechanism.

Fig. 3 is a perspective view of the end of a mine car body showing the portions illustrated in Fig. 2.

Fig. 4 is a top plan view of the same.

Fig. 5 is a partial elevational, partial sectional view of the braking mechanism showing the brake shoes in full application against the wheels.

Fig. 6 is a partial elevational view showing the brake shoes relaxed and ready to be raised.

Fig. 7 is a similar view showing the brake shoes raised and latched out of contact with the car wheels.

Fig. 8 is a similar view showing the brake shoes released from their latched position and about to engage and brake the wheels.

Fig. 9 is a plan sectional view of the braking mechanism drawn to enlarged scale.

Fig. 10 is a vertical sectional view as taken along the line 10—10 of Fig. 5.

Fig. 11 is a similar view taken along the line 11—11 of Fig. 5.

Fig. 12 is a partial horizontal sectional view as taken along the line 12—12 of Fig. 5.

Fig. 13 is a partial perspective of the cross-head and connecting parts.

Fig. 14 is a similar view of one of the brake shoes and connecting operating members.

In the drawings, there is shown in a general manner a conventional form of free running mine car, such as is adapted to be coupled to others to form a train. The car is shown as having a body composed of side walls 20, end walls 21 and 21 and a bottom 22. The body, as is usual, is mounted on a chassis comprising mainly channel sill members 23 which in turn are mounted on trucks 24. The trucks carry a pair of spaced axles 25 having wheels 26 at each of their ends. The wheels are preferably flanged as at 27 as is usual. The foregoing is typical of industrial cars and is in nowise part of the present invention.

In the present form of the invention there is provided a brake lever 28 pivoted at 29 to an end wall of the car. The upper end of this lever protrudes through a guide 30 which is secured to the car and on the member forming the guide there is shown mounted a bell crank shaped lever having one arm 31 in the path of the brake lever and the other arm 32 provided with an upstanding lug or pin 33. The bell crank lever is tensioned by a torsional spring 34 to serve as a latch and at all times to cause the pin 33 to contact with the bail portion 35 of a releasing lever 36 mounted in bearings 37 and having operating handles 38, operable from either side of the car.

Above and below the pivot 29 there is pivotally secured to the brake lever 28, one end of links 39 which at their other ends are pivoted to upstanding portions 40 of operating shafts 41, journalled in bearings 42 secured to the chassis sills 23, the other ends of the operating shafts being formed to produce right angled extensions to form operating arms 43.

Between each pair of wheels there may be provided inverted U-shaped members 44 fixed to the car body and which mount pairs of spaced plates 45.

The following describes only one of the braking mechanisms, though it should be borne in mind that as many such mechanisms may be employed as is desired and as is commensurate with the number of wheels of the car.

On bolts 46 which engage the flanges of the U member 44 and the upper portions of the plates 45 may be strung spacing tubes 47 to effectively position the plates 45 and upon which may be freely pivoted spaced brake shoe links 48. Pivoted at 49 to the free ends of the links 48 are brake shoes 50 having curved grooved outer portions 51 adapted to engage the flanges 27 of the wheels 26.

Each brake shoe is integrally formed with abutments 52 and 53 which are at the proper time engaged by the lower end of an automatically actuated stop bar 54 guided between lugs 55 on the links 48. The stop bar 54 is provided with hook portions engageable over pins 56 on the cross-head arms 57. These arms are each pivoted at one of their ends to one of the levers 48 and at their other ends they are pivoted to each other and to a cross-head 58. The cross head is provided at each end with rectangular portions 59 which protrude through openings 60 in the plates 45 within which they are slidably guided. Affixed to the cross head 58 is upstanding bracket 61 which by means of a link 62 connects with the free end of the operating arm 43. On the operating shaft 41 is a torsional spring 63, one end 64 being anchored to a fixed portion such as the chassis and the other end 65 being fixed with the operating shaft.

Each brake shoe is further provided with an abutting portion 66 adapted to engage the stop pin 67 as will be later described.

In operation starting with the car at rest and with the brakes applied (Fig. 5). To release the brakes, the brake lever 28 is pulled to the left (Fig. 2) until engaged behind the arm 31 where it will be retained until the bail 35 of the releasing lever 36 is actuated by a pull on one of the handles 38. When the brake lever is so moved the operating shafts 41 are rocked through the connections 39, and the operating arms 43 will move in a downward arc. This downward movement, by means of the link 62 will impart downward movement to the cross-head 58 and its rectangular portions 59 which are guided in the openings 60 of the plates 45.

The parts will first assume a position such as shown in Fig. 6 with the braking surfaces 51 of the brake shoes 50 withdrawn from contact with the wheel flanges 27 and the abutments 66 against the stop pins 67, the brake shoes, when released from the wheels, having fallen by gravity to this position. Then as the crosshead 58 continues downward and the free ends of the levers 48 move towards each other, the brake shoes 50 will be swung upwardly on their pivots 49 by reason of the engagement of the abutting portions 66 against the stop pins 67, until the ends of the gravity stop bars 54 engage the stop abutments 52, thus effectively latching the brake shoes in their fully retracted position (Fig. 7).

When the operating shaft 41 was rocked, energy was stored in the torsional spring 63 sufficient to return the parts moved by the brake handle 28 to the position shown in Figs. 2 and 5.

With the brake shoes held latched as described, the car may be set in motion towards the desired point where an attending operator is stationed. The car is preferably set in motion with the end wall, upon which the operating mechanism is affixed, trailing though the mechanism is equally effective regardless of the direction of the car. As the car passes the operator, he lifts one of the handles 38, causing the bail 35 to act against the pin 33 to rock the bell crank lever and so withdraw the arm 31 from its retaining hold on the brake lever. The stored energy of the spring 63 causes an upward movement of the operating arm 43 and through the link 62, of the cross head 58. As the cross head approaches the top of the openings, 60, the pins 56 on the cross head arms 57 engage the hooked portions of the gravity stops 54, raising them from engagement with the abutments 52 (Fig. 8). The free ends of the brake shoes 50 being thus freed, drop down to contact the wheel flanges 27. As the cross head moved up, the free ends of the levers 48 moved from each other freeing the abutments 66 from their stop pins 67. During this action the cross head moved to the top of the openings 60 and in this position the cross head arms 57 form a nearly straight line, with their included angle approximating the angle A, the tangent of which is a function of the coefficient of friction between the crosshead and its guide.

Since the active surface of each brake shoe is eccentric to its pivot, wear on the wheels and brake shoes will be compensated for.

Referring to Fig. 5, it will be seen that the arc or curve of the brake shoes is so constructed that the points of contact between the brake shoes and the wheel flanges will at all times form obtuse angles A with the car axle centers and the centers of the brake shoe pivots 49 on the free ends of the links 48. These angles closely approach 180°.

As the brake shoes contact the wheel flanges, the rotation of one of the wheels tends to straighten the angle A by moving the end 49 of the lever 48 around the fulcrum 47, but since the rectangular portions 59 of the cross head are engaged in the openings 60, the friction between the cross head portions 59 and the sides of the opening 60 will prevent this. To minimize frictional resistance between the cross head and its guide, it will be noticed that the cross head arms 57 are inclined to the horizontal to such an angle that the vertical component of the reacting force passing through the longitudinal axis of the arms 57 plus the deadweight of the cross head mechanism carried by the cross head, balances the frictional resistance between the cross head and its guides plus any resistance of the spring 63 that may act against the downward movement of the crosshead when the brake shoes are released. The other brake shoe will of course contact with its complementary wheel flange but since its rotational direction is opposite in relation to the brake shoe, it will just rest upon the wheel flange. Should the car tend to rebound, this shoe will then act in the same manner as described above relative to the first shoe.

From the foregoing it will be seen that an efficient, simple and inexpensive device for the purpose has been disclosed in a preferred form of its embodiment, but it is not desired to restrict the details to the exact construction shown, it being obvious that many changes and modifications in the form, arrangement of parts, proportions and sizes thereof may well be made without departing from the spirit and scope of my invention in its broadest aspect.

Having thus described my invention, what I claim as new and desire to secure by Letters Patent, is:

1. Braking mechanism for use on wheeled vehicles, comprising freely pivoted brake shoes adapted by virtue of their own weight normally to tend to contact the wheels of the vehicle, means for retaining the brake shoes out of contact with wheels and means associated with the mentioned means to withdraw the retaining means to release the brake shoes for braking contact with the wheels.

2. Braking mechanism for use on wheeled vehicles, comprising pivoted brake shoes adapted normally to tend to contact the wheels of the vehicle, said shoes having their braking surfaces eccentric to their pivots, means for retaining the brake shoes out of contact with wheels and means associated with the mentioned means to withdraw the retaining means to release the brake shoes for braking contact with the wheels, one or more of said shoes being adapted to arrest only the forward movement of the car and one or more of said shoes being adapted to arrest only the rearward movement thereof.

3. Braking mechanism for use on wheeled vehicles, comprising brake shoes adapted normally to tend to contact the wheels of the vehicle, means for retaining the brake shoes out of contact with wheels, said means including abutments on the shoes and gravity latches engageable with the abutments and means to release the abutments from engagement with the latches.

4. Braking mechanism for use on wheeled vehicles, comprising brake shoes adapted normally to tend to contact the wheels of the vehicle, means for retaining the brake shoes out of contact with wheels, said means including abutments on the shoes and gravity latches engageable with the abutments and means to release the abutments from engagement with the latches including a manually operable handle.

5. Braking mechanism for use on wheeled vehicles, comprising freely swingable brake shoes adapted by virtue of their own weight normally to tend to contact the wheels of the vehicle, means for retaining the brake shoes out of contact with wheels while the car is in motion and means including a manually operable handle to withdraw the retaining means to release the shoes so they may gravitationally contact the car wheels to arrest the movement of the car.

6. In a car having wheels, braking mechanism including pivoted brake shoes adapted normally to tend to contact the wheels, abutments on the brake shoes, gravity latches engageable with the abutments, to restrain the brake shoes from contact with the wheels, pivoted links mounting the brake shoes, cross head links pivoted to the pivoted links and to each other, a cross head and means to release the abutments from engagement with the latches so the brake shoes may contact the wheels.

7. In a car having wheels, braking mechanism including pivoted brake shoes adapted normally to tend to contact the wheels, abutments on the brake shoes, gravity latches engageable with the abutments to restrain the brake shoes from contact with the wheels, pivoted links mounting the brake shoes, cross head links pivoted to the pivoted links and to each other, a cross head and means to release the abutments from engagement with the latches so the brake shoes may contact the wheels, a portion of said means comprising hooked ends on the gravity latches and co-acting pins on the cross head links.

8. In a car having wheels, gravity brake shoes for arresting the movement of the car and means for applying the shoes to the wheels comprising a manually swingable handle, a brake handle, means to maintain the brake handle in one of two positions, means associated with the manual handle to free the brake handle from its maintained position, a cross head, means connected with the brake handle to move the cross head, and means associated with the cross head to free the brake shoes so they gravitationally contact the wheels.

9. In a car having wheels, gravity brake shoes for arresting the movement of the car and means for applying the shoes to the wheels comprising a manually swingable handle, a brake handle, means to maintain the brake handle in one of two positions, means associated with the manual handle to free the brake handle from its maintained position, a cross head, means connected with the brake handle to move the cross head, cross head links pivoted to the cross head and to each other at one end, pivoted brake shoe links having pivots for the other ends of the cross head links and means to free the brake shoes so they gravitationally contact with the wheels.

10. In a car having wheels, gravity brake shoes for arresting the movement of the car and means for applying the shoes to the wheels comprising a manually swingable handle, a brake handle, means to maintain the brake handle in one of two positions, means associated with the manual handle to free the brake handle from its maintained position, a cross head, means connected with the brake handle to move the cross head, cross head links pivoted to the cross head and to each other at one end, pivoted brake shoe links, gravity latches guided between respective pairs of brake shoe links, means on the cross head links to withdraw the latches and abutments on the brake shoes to co-act with the latches.

11. In a car having wheels, gravity brake shoes for arresting the movement of the car and means to retain the shoes in a non-contacting position in relation to the wheels comprising a brake handle, means to maintain the brake handle in one of two positions, a cross head, connection means between the brake handle and the cross head and means associated with the cross head to retain the brake shoes out of contact with the wheels.

12. In a car having wheels, gravity brake shoes for arresting the movement of the car and means to retain the shoes in a non-contacting position in relation to the wheels comprising a brake handle means to maintain the brake handle in one of two positions, a cross head, connection means between the brake handle and the cross head, cross head links pivoted to the cross head and to each other at one end, pivoted brake shoe links having pivots for the other ends of the cross head links and means associated with the brake shoe links to latch the brake shoes out of contact with the wheels.

13. In a car having wheels, gravity brake shoes for arresting the movement of the car and means to retain the shoes in a non-contacting position in relation to the wheels comprising a brake handle, means to maintain the brake handle in one of two positions, a cross head, connection means between the brake handle and the cross head, cross head links pivoted to the cross head and to each other at one end, pivoted brake shoe links having pivots for the other ends of the cross head links, gravity latches guided between respective pairs of brake shoe links and abutments on the brake shoes to co-act with the latches to maintain the brake shoes out of contact with the wheels.

14. In a car having wheels, gravity brake shoes for arresting the movement of the car and means for releasing the brake shoes from the wheels comprising a brake handle adapted to be swung, means to maintain the brake handle in one of two positions, a cross head, connection means between the brake handle and the cross head, pivoted brake shoe links, cross head links pivoted to the cross head and to each other at one end and to the brake shoe links at the other, abutment pins and means on the brake shoes engageable with the abutment pins to cause the brake shoes to rock on their pivots when the brake handle is swung manually.

15. In combination with car wheels, braking mechanism comprising a rigid support having elongated openings, a cross head having portions movable in the openings, cross head links pivoted to the cross head and to each other at one end, brake shoe links pivoted to the other ends of the cross head links, and brake shoes pivoted to the free ends of the brake shoe links.

16. In combination with car wheels, braking mechanism comprising a rigid support having elongated openings, a crosshead having portions movable in the openings, cross head links pivoted to the cross head and to each other at one end, brake shoe links pivoted to the other ends of the cross head links, brake shoes pivoted to the free ends of the brake shoe links, the contacting surface of the brake shoes being so constructed that when contacting with the wheel an obtuse angle will be formed at the point of contact, between an extended radius from the car wheel and an extended line drawn from the centre of the brake shoe pivot acting on said wheel.

17. In combination with car wheels, braking mechanism comprising a rigid support having elongated openings, a cross head having portions movable in the openings, cross head links pivoted to the cross head and to each other at one end, brake shoe links pivoted to the other ends of the cross head links, brake shoes pivoted to the free ends of the brake shoe links, and means permitting the brake shoes to contact the car wheels, said contact points forming obtuse angles with the respective wheel centres and brake shoe pivots, said angle also tending to approach 180° and said tendency being counteracted by the friction coefficient between the mentioned cross head portion and the walls of the said openings.

18. In a braking mechanism for use on wheeled vehicles, the combination of freely pivoted brake shoes, adapted normally to fall of their own weight to active position, means to restrain their activity, movable supports upon which the brake shoes are hung, and means on the movable supports to move the brake shoes toward or away from the vehicle wheels.

19. In a braking mechanism for use on wheeled vehicles, the combination of gravity actuated brake shoes, movable supports upon which the brake shoes are hung, means on the movable supports to move the brake shoes toward or away from the vehicle wheels, and means on the supports to retain the brake shoes in inactive position.

20. In a braking mechanism for use on wheeled vehicles, the combination of gravity actuated brake shoes, movable supports upon whch the brake shoes are hung, means on the movable supports to move the brake shoes toward or away from the vehicle wheels, means on the supports to retain the brake shoes in inactive position, and means carried by the movable supports to retract the brake shoe retaining means to permit the brake shoes to gravitate into braking position.

21. In a braking mechanism for use on wheeled vehicles, the combination of gravity actuated brake shoes, movable suports upon which the brake shoes are hung, and means on the supports to retain the brake shoes in inactive position.

22. In a braking mechanism for use on wheeled vehicles, the combination of gravity actuated brake shoes, movable supports upon which the brake shoes are hung, means on the supports to retain the brake shoes in inactive position, and means carried by the movable supports to retract the brake shoe retaining means to permit the brake shoes to gravitate into braking position.

23. In a brake mechanism for wheeled vehicles, a freely pivoted brake shoe normally tending to fall by its own weight to be active but being restrained in inactive position by a manually releasable gravity actuated latch.

24. In a braking mechanism for use on wheeled vehicles, the combination of freely pivoted brake shoes adapted normally to fall of their own weight to active position, and a gravity latch to restrain their activity.

25. In a braking mechanism for use on wheeled vehicles, the combination of freely pivoted brake shoes adapted normally to fall of their own weight to active position, a gravity latch to restrain their activity, and means to release the restraining latch.

26. Braking mechanism for use on wheeled vehicles, comprising brake shoes adapted normally to tend to contact the wheels of the vehicle, a gravity latch for retaining each brake shoe out of contact with the wheels, pivoted brake shoe links to which the brake shoes are freely pivoted, a pair of cross head arms pivotally connected at one of their ends to the brake shoe links and at their other ends to a vertically sliding cross head disposed between the brake shoe links, an abutment on each brake shoe, and stop pins coacting with the shoe abutments when the cross head is raised, to swing the shoes upward out of contact with the wheels and into latching position.

27. Braking mechanism for use on wheeled vehicles, comprising a plurality of brake shoes, one or more for the trailing wheels and one or more for the leading wheels, said shoes having their braking surfaces eccentric to their pivots and being pivoted to fall by gravity into braking position unless restrained, restraining means for same, said brake shoes being so disposed and arranged that the brake shoes for the trailing wheels when released are caused to rotate by their wheels to wedge these wheels to arrest their forward movement while the brake shoes on the leading wheels slide idly on same until the direction of the vehicle is reversed at which time the motion of the latter wheels is arrested by the camming action of the coacting brake shoe, and the former wheels are free to move with their brake shoes idling.

PETER J. DHEIN.